Dec. 7, 1937.  H. R. LEWIS  2,101,620
PULPER
Filed Feb. 12, 1934  4 Sheets-Sheet 1

INVENTOR.
Harold R. Lewis.
BY Philip A. Minnis
ATTORNEY

Dec. 7, 1937.  H. R. LEWIS  2,101,620
PULPER
Filed Feb. 12, 1934  4 Sheets-Sheet 2

INVENTOR.
Harold. R. Lewis.
BY Philip A. Minnis
ATTORNEY.

Dec. 7, 1937.   H. R. LEWIS   2,101,620
PULPER
Filed Feb. 12, 1934   4 Sheets-Sheet 3

INVENTOR.
Harold R. Lewis.
BY Philip A. Minnis
ATTORNEY.

Dec. 7, 1937.   H. R. LEWIS   2,101,620
PULPER
Filed Feb. 12, 1934   4 Sheets-Sheet 4
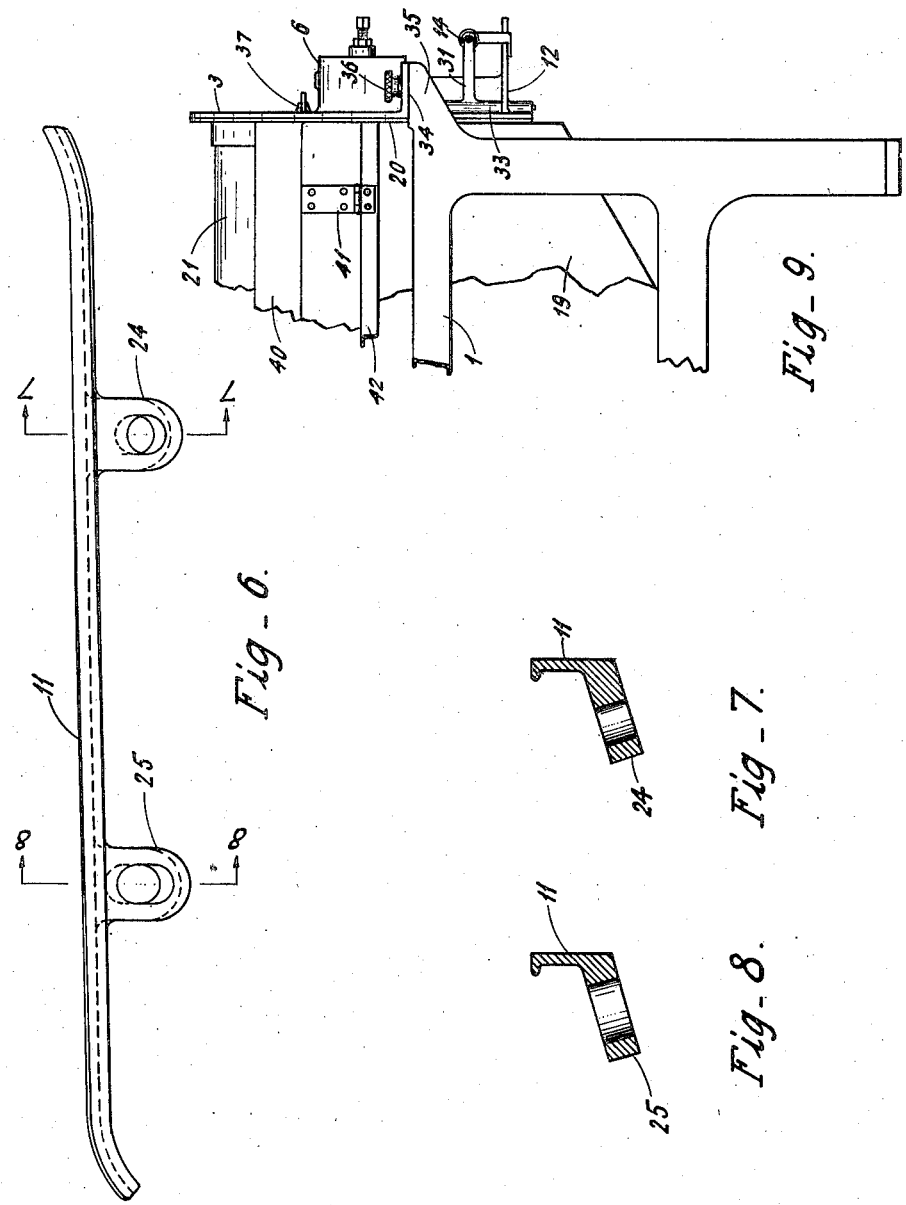
INVENTOR.
Harold. R. Lewis.
BY Philip A. Minnis
ATTORNEY.

Patented Dec. 7, 1937

2,101,620

UNITED STATES PATENT OFFICE 2,101,620

PULPER

Harold R. Lewis, Hoopeston, Ill., assignor to Food Machinery Corporation, San Jose, Calif., a corporation of Delaware Application February 12, 1934, Serial No. 710,781

11 Claims. (Cl. 146—174)

This invention has to do with machines for pulping fruits and vegetables (tomatoes, for example) and extracting the juices therefrom, and it has for its general objects: to increase the production capacity as compared with that of prior machines of similar size; to effect an increase in the amount of juice extracted per unit of material operated upon; and to provide a machine of simplified and sturdy nature in which the operative parts are readily accessible for inspection and cleaning.

In common with certain pulping machines of the prior art, that of the present invention includes a horizontal cylindrical perforated drum or casing having feed and discharge openings at opposite ends and revoluble sweeps or beater blades within, which serve to advance the material in process through the machine and rub it against the internal peripheral surface of the drum to press the juices therefrom through the perforations.

According to prior practice the beater blades or sweeps have been mounted upon and revoluble about a shaft extending longitudinally through and coaxial with the perforated cylindrical drum, the mounting of the blades being such that their peripheral edges travel close to, and in uniformly spaced relation throughout their path, to the internal peripheral surface of the drum. The present invention entails, as one of its features, a departure from the aforementioned practice, which has resulted in a very considerable increase in the percentage of juice extracted from the pulp. This departure from the prior art consists in providing a varying spacial relationship between the inner surface of the drum and the path of revolution of the beaters, this preferably being accomplished by locating the axis of the beater shaft slightly eccentric to the axis of the drum so that the radial gap between the beater blades and the interior peripheral surface of the drum varies throughout the path of revolution of the blades.

Examination of the dross discharged from prior pulpers has disclosed the presence therein of a substantial amount of pulp from which the juice had not been extracted as thoroughly as it had been from the greater part of the mass, and I have found that this has been caused, to some extent at least, by portions of the material in process being carried around and around by the beater blades without being mashed as intended, due to the beater blades becoming fouled by portions of the pulp which prevented other portions of the pulp from being properly acted upon by the blades.

By mounting the beater shaft eccentrically to the axis of the pulping drum, the portions of pulp which might otherwise foul the beater blades is released at each revolution of the beater upon the widening of the gap between the blades and the drum consequent upon the eccentricity of the beater with respect to the drum so that the blades are enabled to act on different portions of the pulp at each revolution. This construction, in conjunction with certain other novel features herein described, has actually resulted in an increase of about four or five percent in the amount of juice extracted from a given volume of the material operated upon.

Among other novel features of the invention may be mentioned the provision at the inlet end of the perforated drum of a circular baffle plate which may preferably be mounted upon and rotatable with the beater shaft, and which functions to obstruct entrance of the material to the drum except through a relatively narrow annular space or passageway between the periphery of the baffle and the internal surface of the drum. The periphery of the baffle plate may preferably be provided with a plurality of supplemental blades which are situated, in part, in the aforementioned annular space or passageway, and which serve partly as supplemental beaters and partly as impellers to force the incoming material through the annular space and into the drum.

The provision of the baffle plate referred to insures that all of the incoming material is forced immediately to the internal peripheral surface of the drum where it is acted upon by the beater blades without delay and with little, if any, possibility of any part of the material escaping the action of the beater blades at the very outset of its travel through the machine. There is thus effected a most important improvement over prior pulping machines in which, although stationary apertured obstructing plates of various kinds have heretofore been used for initially breaking up the incoming material, they have not, so far as I am aware, been constructed so as to positively direct the incoming material immediately to the peripheral surface of the drum. Instead, there has been ample opportunity in the operation of previous pulpers for much of the material to escape immediate action by the beater blades and to find its way well toward the discharge end of the machine before being acted upon. This circumstance, of course, has been an important contributory factor in the failure of such machines thoroughly to extract the juice from the pulp.

Still another feature of this invention consists in a novel mounting of the beater blades whereby to facilitate adjusting their pitch or their radial spacing from the drum, or both.

Another feature consists in the provision of a discharge gate at the outlet of the machine, which is yieldably held in closed or substantially closed position by a spring, the tension of which is so adjusted that the gate will open and permit the dross to be discharged therethrough in response to a predetermined internal pressure. The advantage accruing from this feature is that a given predetermined discharge pressure is maintained, thus insuring at all times the full desired pressing of the pulp whether the pulper is being fed to capacity or intermittently, while at the same time avoiding excessive pressure and consequent clogging of the machine.

A further feature of the invention resides in the provision of a separate end closure for the drum, which may readily be removed when desired for inspection and cleaning purposes.

Additional features, as well as other objects and advantages, will become more apparent hereinafter by reference to the ensuing description, together with the accompanying drawings, in which is illustrated a preferred form of pulping machine constructed in accordance with the present invention.

In the drawings:

Fig. 6 is an edgewise view of a beater blade.

Fig. 7 is a cross section along the line 7—7 of Fig. 6.

Fig. 8 is a cross section along the line 8—8 of Fig. 6.

Fig. 9 is a fragmentary elevation of the discharge end of the machine.

Figure 1:
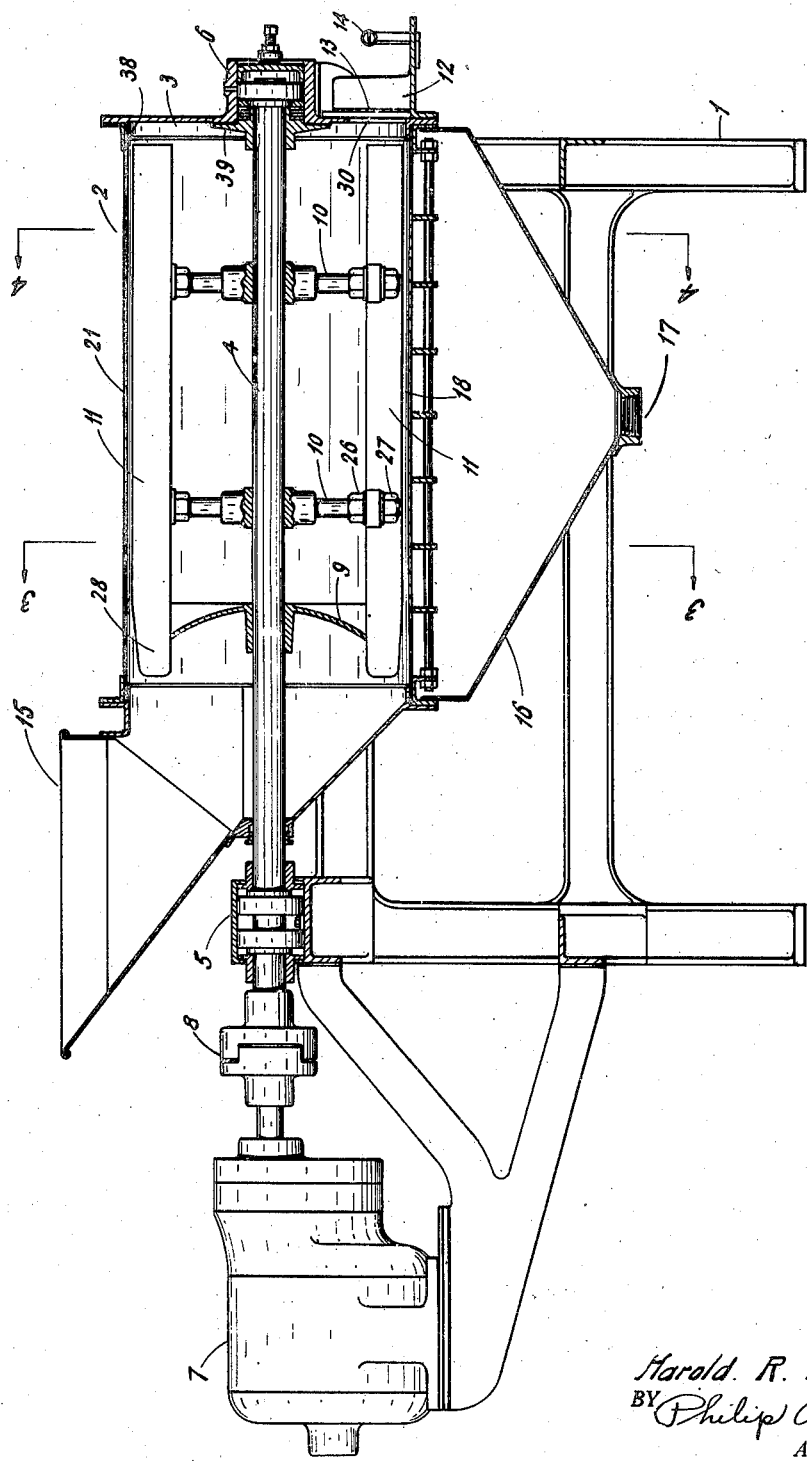
Fig. 1 is a longitudinal sectional view through the machine.

The major components of the machine comprise a supporting frame 1; a cylindrical horizontal drum or casing designated as a whole by reference numeral 2, and provided with a separate removable end closure plate 3; a rotatable shaft 4 journalled in a bearing 5 mounted upon the frame 1 at the inlet end of the machine, and a thrust bearing 6 carried by the closure plate 3, and driven by a motor 7 through a coupling 8; a baffle plate 9 mounted on shaft 4 for rotation therewith; a rotary beater comprising a pair of spiders 10, upon the arms of which are mounted four elongated beater blades or sweeps 11; a discharge chute 12; a hinged discharge gate 13; a spring 14 which normally holds the discharge gate yieldably closed, or partly closed, as the case may be; an inlet hopper 15; and a pan 16 having a fluid discharge outlet 17.

The machine will be recognized as being of a type familiar to the art and, for that reason, will not require a minute detailed description beyond what is necessary clearly to explain the novel features of the present invention and the reasons for the improved results.

Figures 2, 3:
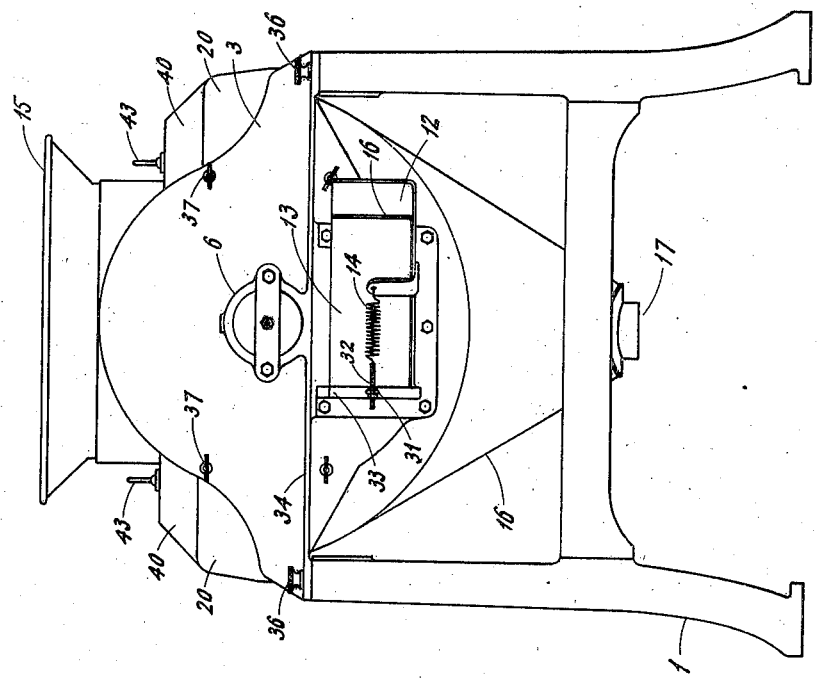
Fig. 2 is an elevational view of the discharge end of the machine.
Fig. 3 is a fragmentary cross-sectional view taken along the line 3—3 of Fig. 1.
Figure 4:
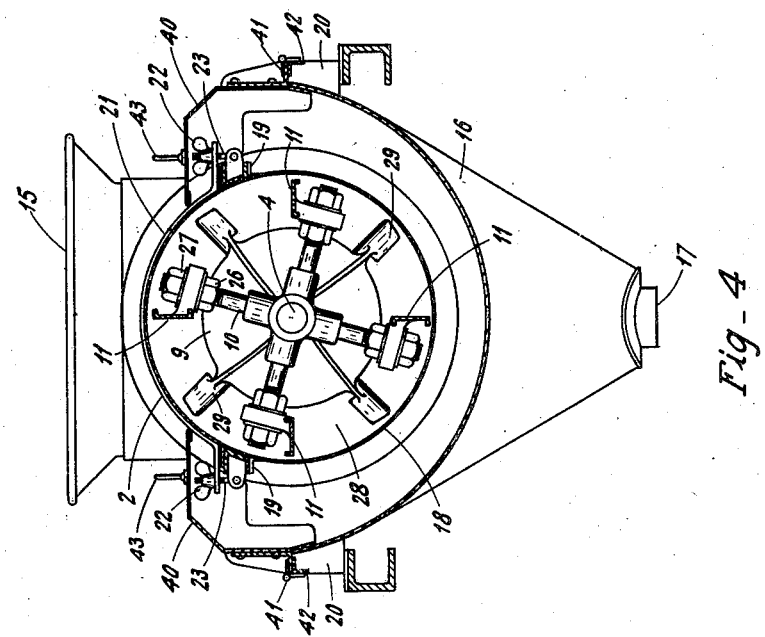
Fig. 4 is a fragmentary cross-sectional view taken along the line 4—4 of Fig. 1.

The drum 2 is preferably circular in cross section as shown in Figs. 3 and 4, and is made up of a pair of separable parts, of which the lower portion comprises a perforated curved plate or screen 18 provided with flanges at its upper edges by which it is supported on a pair of spaced side rails 19 extending lengthwise of the machine and secured at their ends to end castings 20, which are in turn secured to the frame 1 in any suitable manner.

The upper portion of the drum comprises a curved imperforate cover plate 21 having an arcuate internal surface forming a continuation of the internal peripheral surface of the screen 18. The cover 21 is removably held in place by thumb nuts 22 threaded onto bolts 23 pivotally secured to the rails 19. By this construction the cover 21 is easily removable for cleaning the inside of the machine.

In Fig. 3 the horizontal center line of the drum and the horizontal center line of shaft 4 are identified by suitable notations from which it will be observed that the center line of the shaft is slightly lower than the center line of the drum; that is to say, the shaft is eccentric with respect to the center line of the drum. By virtue of this eccentricity, the outer edges of the beater blades 11 approach the inner peripheral surface of the drum more closely at the bottom than they do at the top. Thus, the gap between the beater blades and the drum varies throughout the path of revolution of the blades. It will be understood that the particular degree of eccentricity to be selected will depend upon the particular operating conditions and requirements met with, so that no specific figure applicable to all cases can be given. I have found, however, that for pulping tomatoes an eccentricity of about three thirty-seconds of an inch is satisfactory.

It is desirable that the working edges of the beater blades move relatively close to the surface of the screen in order that a thorough maceration of the material may be accomplished, but it will be observed that the narrowness of the gap, were it not for the eccentricity of the shaft location, would serve to prevent effective treatment of some of the material, as hereinbefore explained. By the eccentric construction described, however, such material as would otherwise become fouled on the beater blades and thereby be carried around and around, is released as the gap widens and other portions of the pulp are engaged by the blades as they again approach the drum surface, so that during operation all parts of the pulp are effectively treated.

It will also be seen that the beater blades, in addition to imparting rotational motion to the material, whereby it is caused to rub against the surface of the screen, also function recurrently to press the material radially against the screen, thus positively crushing portions of the material which might not become sufficiently macerated by the rubbing action alone.

As all of the four beater blades 11 are identical in construction, a description of one of them will suffice for all. As illustrated in Figures 6, 7 and 8, each beater blade has two lugs, 24 and 25, respectively, the former of which is provided with a round hole and the latter with an elongated slot. The beater blades are mounted through the medium of these lugs upon the threaded arms of spiders 10, and held in place by nuts 26 and 27. The positions of the blades, as will be evident, are adjustable radially so as to vary their spacing from the drum surface and, consequently, the degree of maceration, by means of the nuts 26 and 27, and by virtue of the elongated holes in the lugs 25 the pitch of the beater blades is also adjustable. Otherwise expressed, the blades are adjustable angularly in a plane approximately tangential to the path of revolution. By making the angle or pitch of the beater blades adjustable, as described, the rate at which the material in process is fed through the drum is rendered variable because, as will be manifest, the beater blades not only serve to revolve the material but also to move it gradually toward the discharge end. The desirable speed at which the material should be thus moved is the maximum speed attainable without objectionable retention of juice in the dross discharged. If the material is moved too rapidly an excessive amount of juice may be discharged with the dross.

It will be observed that both extremities of the beater blades are curved. The function of the curvature at the intake end of the blades is to forcibly draw into the drum the incoming material which is fed into the hopper 15, and the function of the curvature of the discharge end of the blades is to expedite moving the dross toward and through the discharge opening.

The circular baffle plate 9 is located at the inlet end of the drum (see Fig. 1) and is mounted upon shaft 4 and rotatable therewith. It is of such diameter as to leave an annular opening 28 through which the material to be processed may enter the drum, but the opening thus formed is of such narrowness, radially, that all the incoming material is certain immediately to encounter the beater blades and be thereby operated upon and brought into engagement with the peripheral surface of the drum—there being substantially no opportunity for any of the incoming material to escape the beater blades by entering through the axial area of the drum. Thus it becomes a practical certainty that all the material in process will be operated upon throughout its entire travel through the drum and that little, if any, will escape being thoroughly macerated and the juice expressed.

The baffle plate 9 is preferably dish-shaped in form with its concave surface facing the receiving end of the drum, as illustrated in Fig. 1. This concavity of the baffle serves both to assist the delivery of material towards the surface of the drum 2 by the centrifugal effect on incoming material contacting therewith, and also it increases the holding capacity of the feed hopper 15, which is of considerable advantage since ordinarily the material is fed intermittently to the hopper in batches and it is desirable that it have an excess capacity so that an excess of material can be deposited therein.

Baffle plate 9 is provided with a plurality of peripheral blades 29 which are set angularly with reference to the axis of rotation so as to draw the incoming material into the drum, and they extend through the annular passageway 28. These blades alternate circumferentially with the main beater blades 11, which also extend through the passageway, and they function not only to help move the incoming material forward into the drum through the annular inlet passageway but also act as supplemental beaters.

In operating on fruit or vegetables, such as tomatoes, consisting of large pieces, it is highly desirable that they be quickly broken up at the outset so that the pulp can more quickly and effectively be acted upon by the main beater blades 11; but it is not desirable to continue such vigorous beating of the material in process beyond the initial stage, because to do so might result, not merely in extracting the juice together with certain desirable solids, but also in breaking up and passing through the screen certain parts of the solid matter which it is desired to dispose of as dross. The blades 29 serve this purpose in addition to their other function previously mentioned.

A discharge opening 30 is provided in the end closure plate 3, which opening is normally closed, or nearly closed, by a gate 13 held in its closed position by a coil spring 14, which is connected at one end to an arm 31 integral with the gate 13, through the medium of an adjusting screw 32 by means of which the spring tension can be varied. The discharge chute 12 is situated in registration with the discharge opening 30, and the gate 13, when open, forms one side of the discharge chute which, as will be observed upon examination of Fig. 5, projects angularly from the discharge opening. Gate 13 is hinged at 33 about which point it will swing open whenever a sufficient internal pressure is exerted upon it.

It is desirable, on the one hand, that the dross be discharged without excessive delay, so that the machine will be able to handle as much material as possible, but on the other hand, if the material is allowed to pass through too rapidly the juices will not be extracted to the desired extent. Inasmuch as the spring tension on the discharge gate affects the degree of treatment of the pulp by regulating the rate of discharge of the dross, it will be seen that the spring tension may be adjusted according to requirements so as to insure a proper degree of treatment of the pulp, but not greater. Excessive spring tension may result not only in excessive reduction of operating capacity but also in squeezing out of the pulp some undesirable sediment. An advantageous characteristic of the spring-pressed discharge gate is that the discharge pressure is maintained constant regardless of whether the pulping machine is operated continuously or intermittently.

Figure 5:
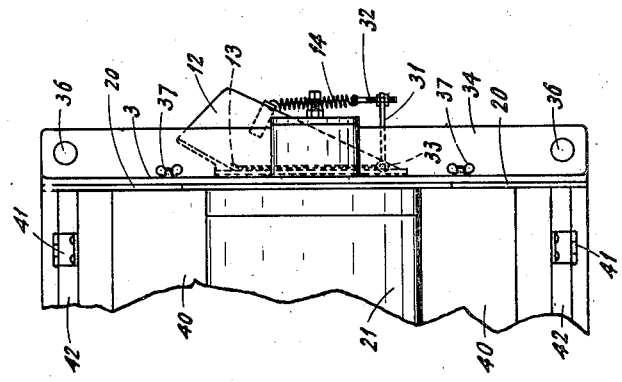
Fig. 5 is a fragmentary plan view of the discharge end of the machine including the spring-pressed discharge gate and chute.

In order to facilitate cleaning the interior of the drum 2 the end closure plate 3 is removably secured in place over the end of the drum. As best seen in Figs. 2, 5 and 9, the closure plate 3 is provided with a horizontal flange 34, which is seated at its outer ends upon bracket portions 35 of the frame; the plate being held in position by hand screws 36 passing through the flange into tapped recesses in the brackets 35 and by wing nuts 37 on threaded pins projecting through the closure plate from the adjacent end castings 20. The inner face of the closure plate is provided with a sealing ring 38 which fits telescopically into the drum 2, and the bearing 6 is shielded from the contents of the drum by a circular plate 39 secured to, and rotatable with, the beater shaft 4.

The expressed juice, together with such solids as may pass through the screen, drop into the pan 16 from which they are discharged through the outlet 17. As illustrated, the upper side portions of the pan 16 are preferably spaced from the drum 2 sufficiently to provide access to the inside of the pan for cleaning, and the opening between the pan and drum may be enclosed by covers 40 extending for the length of the drum and hinged at 41 to side rails 42 extending between the end castings 20. Handles 43 may be provided for opening the covers.

For certain purposes the extracted juice from the pulping machine may subsequently be put through another process known as "finishing". The finishing machine, as is well known, is similar in practically all respects to the pulping machine, the chief difference being that its screen has smaller perforations. Manifestly, the novel features of the present invention here shown applied to a pulping machine are equally applicable to finishing machines, and the terms "pulper" and "pulping machine" as used in the foregoing description and in the appended claims, are to be construed as inclusive of finishers and finishing machines, or other devices of like nature.

Having now described my invention and in what manner the same may be used, what I claim as new and desire to protect by Letters Patent is:

1. A pulping machine including a perforated drum, a shaft extending longitudinally therewithin, means for driving said shaft, and a sweep secured to said shaft for rotation therewith to sweep material around the drum and force it against the perforations in said drum, the relation between the curvature of the inner surface of the drum and the path of revolution of the sweep being such that the sweep alternately approaches and recedes from the surface of the drum as it revolves, and a baffle having spaced beater blades cooperating with the said sweep to direct the incoming material to the inner peripheral surface of the drum and in line with the travel of the sweep.

2. A pulping machine including a cylindrical perforated drum and a feed hopper, a shaft extending longitudinally therewithin and eccentric to the axis of the drum, means for driving said shaft, and a sweep secured to said shaft for rotation therewith to sweep material around the drum and force it against the perforations in said drum, and a baffle having a concave face at the exit of said hopper to increase the hopper capacity and secured to said shaft to rotate in unison therewith.

3. A pulping machine including a perforated drum, a shaft extending longitudinally therewithin, means for driving said shaft, sweeping means secured to said shaft for rotation therewith to force material against the perforations in said drum, means for introducing material into one end of said drum, and a concave faced baffle disposed in the receiving end of said drum and secured to said shaft for rotation therewith, the outer edge of said baffle being spaced from the inner periphery of the drum to provide an inlet passageway through which material is introduced into the drum, said baffle having beater blades around its periphery and spaced uniformly with said sweeping means.

4. A pulping machine including a perforated drum, a shaft extending longitudinally therewithin, means for driving said shaft, sweeping means secured to said shaft for rotation therewith to force material against the perforations in said drum, means for introducing material into one end of said drum, and a circular imperforate concave faced baffle mounted at the receiving end of the drum and secured to said shaft for rotation therewith, said baffle having its edge spaced from the inner surface of the drum so as to restrict the entrance of incoming material to a path adjacent the drum surface, and having a series of beater blades around its periphery to cooperate with said sweeping means to direct the incoming material to the inner surface of said drum.

5. A pulping machine including a perforate drum, and a feed hopper, a shaft extending longitudinally therewithin, means for driving said shaft, a sweep secured to said shaft for rotation therewith to force material against the perforations in said drum, means for introducing material into one end of said drum, and a baffle disposed in the receiving end of said drum and having its outer edge spaced from the inner periphery of the drum to provide an inlet passageway through which material is introduced into the drum, said sweep having one end thereof projecting through said passageway, and said baffle having a concave face adjacent the said feed hopper to increase the hopper capacity.

6. A pulping machine including a perforated drum, a shaft extending longitudinally therewithin, means for driving said shaft, a sweep secured to said shaft for rotation therewith to force material against the perforations in said drum, means for introducing material into one end of said drum, and a baffle disposed in the receiving end of said drum and having its outer edge spaced from the inner periphery of the drum to provide an inlet passageway through which material is introduced into the drum, said sweep having one end thereof projecting angularly through said passageway to assist the introduction of material therethrough.

7. A pulping machine including a perforated drum, a shaft extending longitudinally therewithin, means for driving said shaft, a plurality of sweeps secured to said shaft for rotation therewith to force material against the perforations in said drum, means for introducing material into one end of said drum, a baffle disposed in the receiving end of the drum and having its outer edge spaced from the inner periphery of the drum to provide an inlet passageway through which material is introduced into the drum, said sweeps projecting into said passageway, and a plurality of auxiliary sweeps projecting from the edge of said baffle into said passageway and disposed in alternate relation to said first mentioned sweeps.

8. A pulping machine including a perforated drum, a shaft extending longitudinally therewithin, means for driving said shaft, sweeping means secured to said shaft for rotation therewith to force material against the perforations in said drum, means for introducing material into one end of said drum, and a dished baffle mounted in the receiving end of the drum for rotation with said shaft and having its concave surface facing the receiving end of the drum, the outer edge of said baffle being spaced from the inner periphery of the drum to provide an inlet passageway through which material is introduced into the drum, said baffle having peripheral beater blades spaced relative to said sweeping means and coating therewith to force the incoming material to the inner surface of said drum.

9. A pulping machine including a perforated screen member and a rotary sweep member operatively positioned relative to said screen member to force material through and along said screen member for treatment thereof, and means for introducing material to be treated onto said screen member, a discharge chute angularly disposed relative to the axis of the machine, a gate member closing the outlet to said chute and yieldable means holding said gate member in closed position until the internal pressure on the flowing material overcomes the said yielding means and opens the said gate, said yielding means producing a variable increasing back pressure to the flow of material as the gate opens to thereby control the speed of material discharge and get the maximum efficient operative treatment from the machine.

10. A pulping machine including a tubular drum having perforations in its curved side wall and having a material inlet at one end and a dross outlet at the other end, a shaft extending longitudinally therewithin, and a sweep secured to said shaft for rotation therewith to sweep material around the drum and wipe the material against the curved side wall of the drum to separate from said material substantially all of the liquid constituents which are discharged through said perforations, said sweep being angularly disposed to feed the material longitudinally of said drum from said inlet to said outlet as the material is swept against the drum, the solid constituents of said material being discharged by said sweep from the end of the drum through said dross outlet, the relation between the curvature of the inner surface of the drum and the path of revolution of the sweep being such that the sweep alternately approaches and recedes from the curved side wall surface of the drum as it revolves, whereby to permit slippage between the sweep and the mass of material being swept thereby over the drum surface to reposition the sweep with respect to said material to facilitate the extraction of substantially all liquid constituents therefrom.

11. A pulping machine including a tubular drum having perforations in its curved side wall and having a material inlet at one end and a dross outlet at the other end, a shaft extending longitudinally therewithin and mounted eccentrically with respect to the axis of the drum, and a sweep secured to said shaft for rotation therewith to sweep material around the drum and wipe the material against the curved side wall of the drum to separate from said material substantially all of the liquid constituents which are discharged through said perforations, said sweep being angularly disposed to feed the material longitudinally of said drum from said inlet to said outlet as the material is being swept against the drum, the solid constituents of said material being discharged by said sweep from the end of the drum through said dross outlet, the eccentric mounting of said shaft relative to said drum axis causing the sweep to alternately approach and recede from the curved side wall surface of the drum as it revolves, whereby to permit slippage between the sweep and the mass of material being swept thereby over the drum surface to reposition the sweep with respect to said material to facilitate the extraction of substantially all liquid constituents therefrom.

HAROLD R. LEWIS.